United States Patent [19]
Mandula et al.

[11] 3,919,628
[45] Nov. 11, 1975

[54] METHOD AND APPARATUS FOR ROTATING A FLAW DETECTOR ABOUT A TEST PIECE AND GUIDING IT RELATIVE TO UNDULATIONS AND BENDS

[75] Inventors: Joseph M. Mandula, Seven Hills; John P. Baraona, Parma; Chester J. Mates, Eastlake, all of Ohio

[73] Assignee: Republic Steel Corporation, Cleveland, Ohio

[22] Filed: Apr. 26, 1974

[21] Appl. No.: 464,569

[52] U.S. Cl. .................................................. 324/37
[51] Int. Cl.² ........................................... G01R 33/12
[58] Field of Search ................................ 324/37, 40

[56] References Cited
UNITED STATES PATENTS

| | | | |
|---|---|---|---|
| 1,907,755 | 5/1933 | Drake | 324/37 |
| 1,937,760 | 12/1933 | Jones | 324/37 |
| 1,960,968 | 5/1934 | Drake | 324/37 |
| 1,976,837 | 10/1934 | DeLanty et al. | 324/37 |
| 1,980,669 | 11/1934 | Drake | 324/37 |
| 3,447,074 | 5/1969 | Sower et al. | 324/37 |
| 3,593,120 | 7/1971 | Mandula et al. | 324/37 |
| 3,736,501 | 5/1973 | Donkin | 324/37 |
| 3,746,972 | 7/1973 | Mandula et al. | 324/37 |

*Primary Examiner*—Robert J. Corcoran
*Attorney, Agent, or Firm*—Watts, Hoffmann, Fisher & Heinke Co.

[57] ABSTRACT

An apparatus and method for detecting flaws in elongated moving workpieces is disclosed. The apparatus includes flaw detecting head assemblies which move orbitally about the workpieces. The head assemblies each include a workpiece engaging guide structure slidably engageable with a workpiece and a flaw sensor assembly which cooperates with the guide structure so that the flaw sensor assembly is maintained in an effective flaw detecting relationship with the workpiece, despite undulations in the workpiece. The guide structure tracks undulations in the workpiece and the sensor assembly is constrained to move with such tracking motion of the guide structure. The flaw sensor assembly is biased to continuously maintain sliding contact with the workpiece surface and is allowed to pivot about an axis normal to the direction of workpiece motion, for added compliance with workpiece surface irregularities. Each head assembly is resiliently mounted on a support to permit limited universal deflections of the head in response to force applied to it.

6 Claims, 7 Drawing Figures

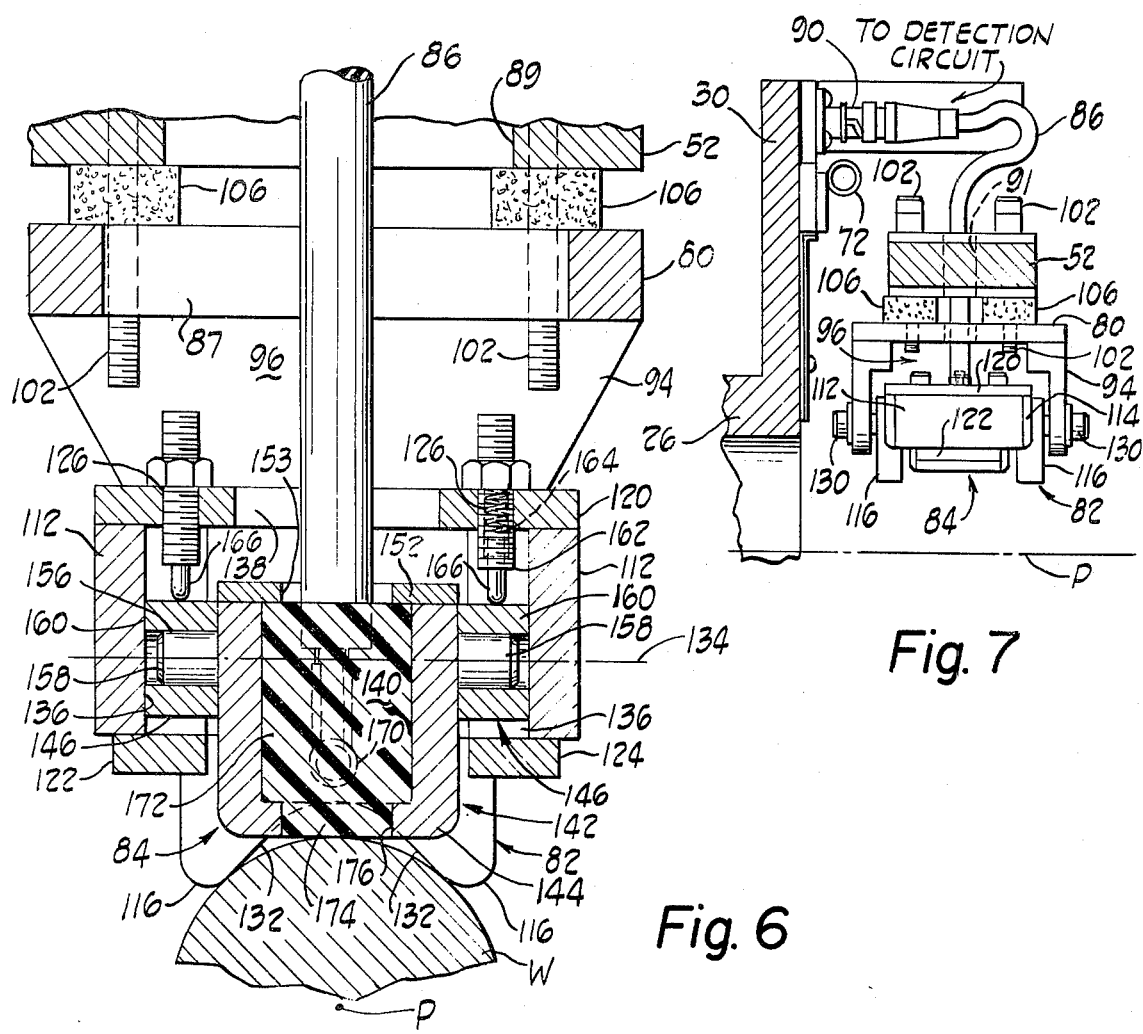
Fig. 7
Fig. 6
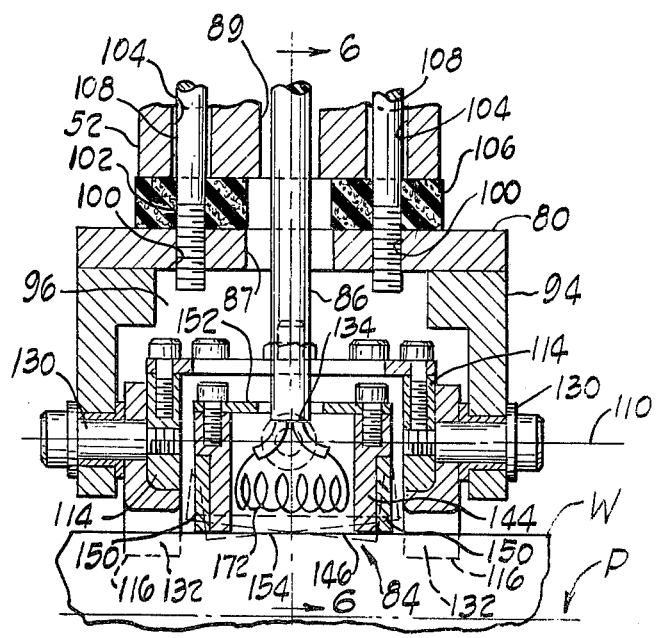
Fig. 5

METHOD AND APPARATUS FOR ROTATING A FLAW DETECTOR ABOUT A TEST PIECE AND GUIDING IT RELATIVE TO UNDULATIONS AND BENDS

BACKGROUND OF THE INVENTION

1. Field of the Invention

This invention relates to nondestructive material testing and particularly to flaw detection in elongated workpieces.

2. The Prior Art

Various methods and apparatus have been proposed for enabling nondestructive testing of elongated metal workpieces such as wires, rods, tubing, pipe and billets. These proposals generally detected seams, voids and other defects which could be troublesome in a final product made from such workpieces.

In the past, a common method of inspecting such workpieces for defects was by visual observation. In spite of the utmost care, a mill inspector often overlooked seams or other defects. Moreover, visual inspection did not dependably determine the depth of a defect. Another problem with visual inspection is that it is dependent on human judgment and vision, both of which are subject to change, even in the same inspector.

These problems have been overcome to a considerable extent by the use of automatic nondestructive testing equipment. Generally, such equipment operates by moving a sensor assembly over the surface of the workpiece to be tested. Such a sensor assembly may be responsive to the pattern of ultrasonic sound waves, eddy currents, or distortion of magnetic fields induced in the workpiece for test purposes.

Systems have been constructed which provide for moving the sensor orbitally about the axis of the workpiece, while simultaneously moving the workpiece longitudinally along a nominal travel path. This compound motion caused the sensor assembly to trace a generally helical path over the external surface of the workpiece. A plurality of sensor assemblies were provided such that they simultaneously scanned adjacent portions of the workpiece, resulting in a complete scanning of each piece. Apparatus for accomplishing such functions is shown in U.S. Pat. No. 3,746,972 to Mandula et al.

Effective and accurate automatic flaw testing requires that the sensor assembly maintain an operative directional orientation with respect to the axis or center line of the workpiece, and that a predetermined spacing relationship exist between workpiece surface and sensor assembly. Such predetermined spacing is commonly enabled by including in the sensor assembly a flaw sensing element supported by a wear shoe member and holding the wear shoe in sliding contact with the workpiece surface.

Workpieces of the character referred to frequently had undulations and surface irregularities which caused disorientation of the sensor assembly with respect to the workpiece or which caused the sensor assembly to "jitter" or leave the workpiece surface entirely. Such occurrences often caused the sensor assembly to produce spurious signals, indicating flaws where none existed, or caused the sensor assembly to fail to detect actual flaws.

It is apparent that in this field it is desirable to maintain a maximum degree of consistent alignment and contact between the sensor and the surface of the workpiece being inspected. Considerable effort in the past has been made to develop mountings for sensor assemblies to faithfully track undulations and irregularities in the surfaces of workpieces over which the sensor is moved. An example of such efforts is shown in U.S. Pat. No. 3,263,809, to Mandula et al. This patent shows a detection head bearing a sensor which is gimbal mounted for pivotal motion simultaneously in two normal axes, one of the gimbal cages additionally being spring mounted.

Such apparatus has proven effective in flaw detection in relatively large diameter workpieces, such as pipe. In small diameter workpieces, however, the undulations and irregularities which occur are often of much greater magnitude, relatively, than in larger workpieces. For example, substantial lengths of rod or wire of less than 1 inch diameter are relatively readily bent, and the resulting undulations in the workpiece may be abrupt. Where a prior art apparatus was employed, the sensor assembly had to be positioned so near the center line of the small diameter stock that even small movements of the sensor assembly relative to the workpiece, caused when the sensor assembly encountered an undulation, substantially affected its directional orientation and hence its effectiveness.

These inherent difficulties, peculiar to small diameter workpiece testing, render desirable the development of a test apparatus which maintains the operative directional orientation and positioning of the sensor assembly.

It is desirable that a single test device be able to accommodate stock of differing sizes. Where small diameter stock is concerned, the difficulty in satisfying this requirement increases, because a variation in workpiece size which is small absolutely may be large relatively, and such variations may substantially affect the manner of engagement of such workpieces with the sensor assembly.

SUMMARY OF THE INVENTION

The present invention provides a method and apparatus for application of the techniques of automatic flaw testing to workpieces having relatively small cross-sectional dimensions despite the inherent difficulties of such application explained above. The invention enables a sensor assembly to maintain a consistent orientation and spacing with respect to workpieces being inspected, particularly when the workpieces are of small cross-sectional dimensions, and have undulations and surface irregularities.

In a preferred embodiment of the invention, flaws in each workpiece are detected by means of a sensor assembly mounted on a detection head. The sensor assembly includes a flaw sensor for emitting a signal in the presence of workpiece flaws. The sensor assembly is supported by workpiece engaging guide structure which slidably engages the workpiece surface and enables the sensor assembly to effectively track along workpiece surfaces despite workpiece undulations or irregularities.

The workpieces are propelled longitudinally along a nominal travel path and the guide structure slidably engages the moving workpieces and is movable with respect to the travel path for tracking undulations in the workpieces. The sensor assembly is connected to the guide structure for movement with is tracking motion to maintain an effective substantially constant directional orientation of the sensor assembly with respect to the workpiece.

The sensor assembly is movable relative to the guide structure to independently track the workpiece undulations. The sensor assembly is biased into sliding contact with the surface of the moving workpiece for movement independently of the guide structure toward and away from the workpiece travel path. The sensor assembly is also pivotally mounted about an axis extending through the sensor assembly in a plane perpendicular to the travel path to achieve an additional degree of movement independent of the guide structrue. This maintains consistent spacing and directional orientation of the flaw sensor with respect to the workpiece surface.

In a preferred form of the invention the detection head is orbitally moved about the workpiece travel path to enable substantially complete inspection of the workpiece surface. When a workpiece undulation or irregularity is encountered, the positional relationship between the head and the irregularity changes due to the orbital motion of the head about the workpiece. The compound tracking motion of the sensor assembly, both with the guide structure and relative to the guide structure, enables the sensor assembly to be maintained in a consistent flaw detecting relationship with the workpiece during its orbital motion about the workpiece despite workpiece undulations.

A significant feature of this invention resides in the provision of additional workpiece tracking capability by resiliently mounting the detection head for limited universal motion so that the head is universally deflectable to a limited extent when workpiece undulations or irregularities are encountered.

In the preferred embodiment, the workpiece engaging guide structure includes two pairs of workpiece engaging surfaces. Each pair of the surfaces engages the workpiece periphery at spaced locations. The workpiece engaging surface pairs are spaced longitudinally apart along the nominal travel path with the sensor assembly disposed between them. The sensor assembly and the guide surface pairs are constrained for movement together about a pivot axis extending generally parallel to the travel path for enabling the guide structure and sensor assembly to track workpiece undulations which extend laterally from a plane containing the pivot axis and the travel path. The sensor assembly is movable toward and away from the travel path independently of the guide structure to enable workpiece undulation tracking by the sensor assembly during other portions of the orbital movement when the undulations do not cause tracking movement of the guide structure. As previously mentioned, the sensor assembly is also pivotably movable about an axis which extends in a plane transverse to the travel path between the guide surface pairs. This permits further accommodation of the sensor assembly to workpiece undulations or irregularities located axially between the guide surface pair locations. The limited universal mounting of the entire inspection head enables the head assembly to follow undulations which might otherwise tend to cause one or the other guide surface pairs to momentarily disengage from the workpiece.

In the preferred embodiment of the invention the guide surface pairs each comprise two portions of convergent planes forming roughly a V-shape. This V-shape guide configuration allows different sized workpieces to be inspected without requiring adjustment of the inspection head. Relatively small diameter workpieces engage the V-guide closer to the sensor assembly than those with large diameters but the workpiece centerlines remain aligned with the sensor assembly.

DESCRIPTION OF THE DRAWINGS

FIG. 5 is a cross-sectional view seen approximately from the plane indicated by the line 5—5 of FIG. 3;

FIG. 6 is a cross-sectional view of the part of the apparatus shown in FIG. 5, seen approximately from the plane indicated by the line 6—6 in FIG. 5; and, FIG. 7 is a cross-sectional view seen approximately from the plane indicated by the line 7—7 of FIG. 4 with portions broken away.

DESCRIPTION OF A PREFERRED EMBODIMENT

Figure 1:
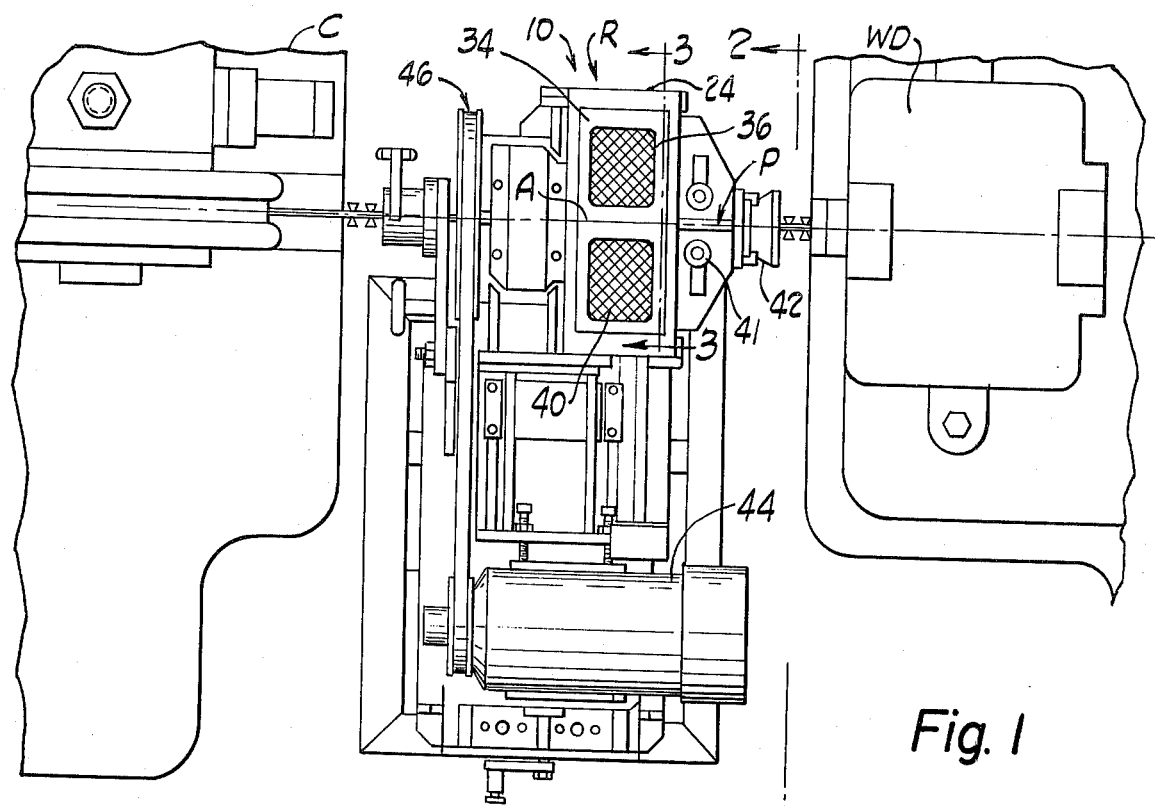
FIG. 1 is a top plan view of part of a workpiece inspection system embodying the present invention associated with ancillary porduction equipment.

A system 10 embodying the present invention for detecting flaws in workpieces is shown in FIG. 1. The system 10 preferably detects flaws in ferrous wire workpieces W moving along a nominal travel path P from a conventional wire drawing machine WD to a cold header C for cold working the wire W to form ball joints. When flaws, such as cracks or voids, in the wire W, which would result in the production of defective ball joints are detected the system 10 produces a signal to indicate need for corrective action by the machine operator.

The system 10 comprises a supporting framework 12 and an inspection assembly R connected to the supporting framework 12 by an articulating structure S. The assembly R detects flaws in the workpieces W moving through it along the nominal travel path P. The articulating structure S enables the inspection assembly R to move in response to bends in the workpieces passing through it, in order to maintain correct operative relative positioning between the inspection assembly R and the workpieces W.

Figure 2:
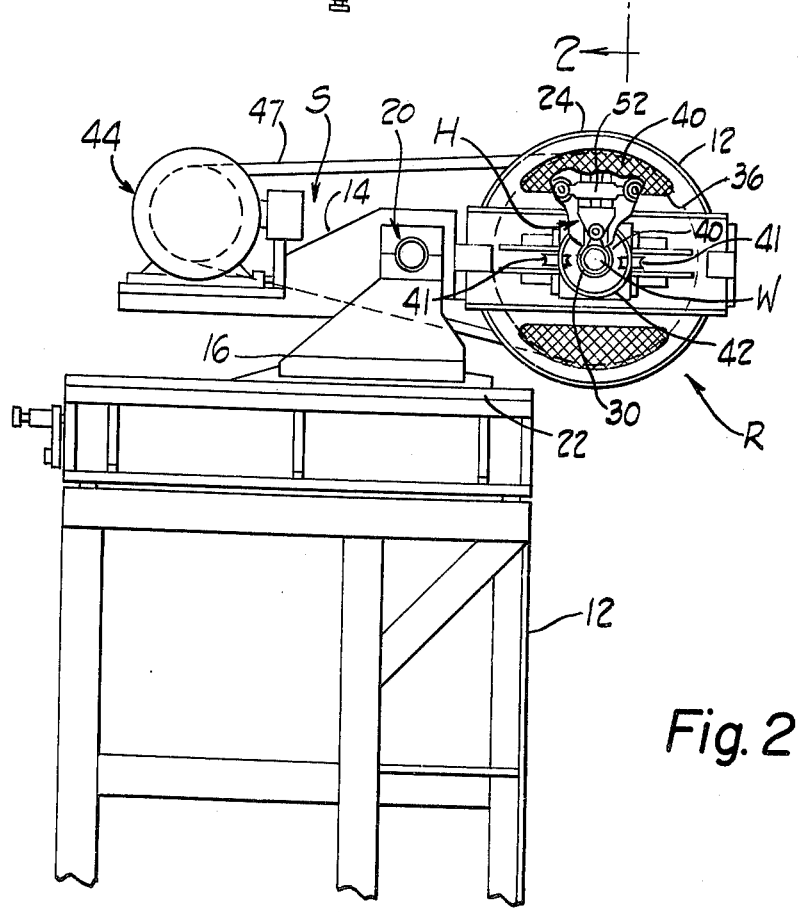
FIG. 2 is an elevational view of part of the system of FIG. 1 as seen approximately from the plane indicated by the line 2—2 of FIG. 1.

The supporting framework 12, as shown in FIG. 2, may be of any heavy construction suitable for machinery of considerable weight and as illustrated is constructed from interconnected vertical and lateral frame members.

The articulating structure S enables the inspection assembly R to pivot about an axis parallel to the path P and to shift laterally toward and away from the path P to enable the assembly R to follow undulations in the workpieces passing through it. The articulating structure comprises a support frame 14 which supports the inspection assembly R and which is journaled to a base 16 by a trunion 20 extending parallel to the nominal travel path P. The base 16 is slidably mounted on the supporting framework 12 by horizontal ways 22 extending transversely to the nominal travel path P so that the articulating structure S can be shifted laterally away from travel path P to enable maintenance and servicing of assembly R. Structure similar to this articulating structure is described in U.S. Pat. No. 3,746,972 to Mandula.

Figure 3:
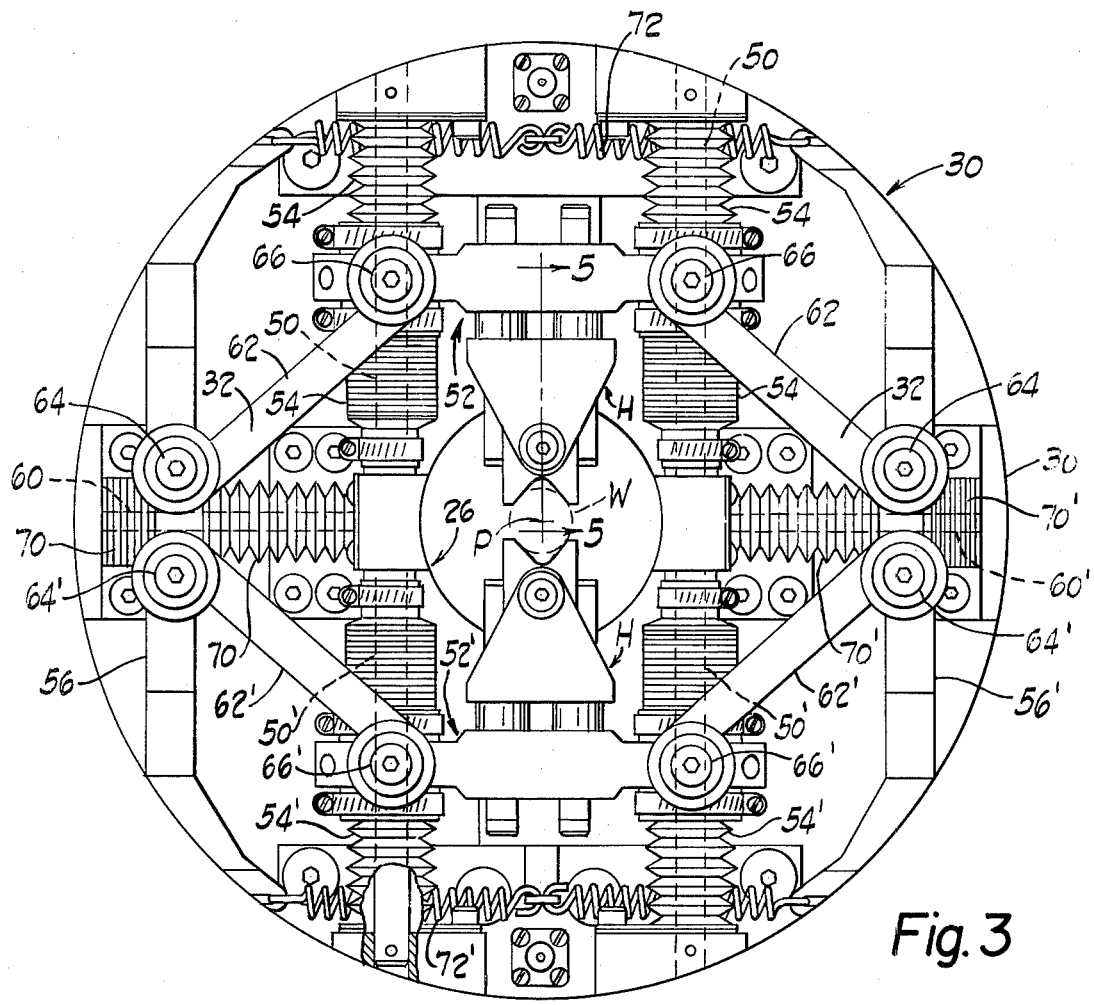
FIg. 3 is a cross-sectional view of part of the apparatus seen approximately from the plane indicated by the line 3—3 of FIG. 1.

The inspection assembly R is constructed and arranged to provide for orbital motion of a pair of inspection heads H about a workpiece W passing through the assembly R so that the workpiece is inspected along parallel helical inspection paths. The assembly R includes an open ended housing 24 mounted on a projecting end of the frame 14 so that the nominal travel path P extends through the housing. A generally tubular rotatable support unit 26 is disposed within the housing 24 for supporting the heads H. The support unit 26 includes a generally cylindrical tubular body portion, not illustrated in detail, which surrounds the travel path and has an annular flange-like head supporting portion 30 (see FIGS. 3 and 4) at one end. Actuator linkages 32, shown in FIG. 3, are connected between the heads H and the head supporting portion 30 for moving the heads into their inspection positions for detecting flaws in the workpieces W.

The housing 24 comprises a generally cylindrical rigid cage 34 defining openings 36 which are covered with protective screening 40 to permit the interior of the assembly R to be viewed from outside the housing.

A guide trumpet 42, having generally the shape of a hollow truncated cone, is attached to the end of the cage 34 through which the workpieces W enter. The trumpet 42 surrounds and guides the workpieces into the cage 34 and into engagement with a pair of guide rolls 41 mounted in the cage 34 adjacent the path P. The guide rolls 41 interact with undulations in the workpieces within the cage 34 to exert forces tending to urge the assembly R to track the undulations. The articulating structure S enables the assembly R to follow the workpiece undulations in both the vertical and horizontal directions, to maintain the cage 34 properly aligned with the incoming workpiece W.

The support unit 26 is journaled in the housing 24 for rotation concentric with the nominal travel path P, and is preferably driven by an electric motor 44 attached to the frame 14 (see FIGS. 1 and 2). In the preferred embodiment, the support unit 26 carries a pulley 46 at its end remote from the support portion 30 and a drive belt 47 extends between the motor 44 and the pulley. The heads H are preferably constructed to detect workpiece flaws as a result of sensed changes in electrical properties of the workpiece and the support unit body portion is provided with a suitable slip ring construction (not shown) to enable the heads to remain electrically connected to circuitry remote from the assembly R as the support unit 26 rotates.

In the preferred and illustrated construction, the heads H are supported on the unit 26 for radial movement toward their inspection positions by the actuator linkages 32 which are in turn operated by centrifugal forces created by rotation of the support unit 26. When the support unit rotates at relatively low speeds, or is stationary, the heads H are moved radially away from the travel path to retracted positions.

Figure 4:
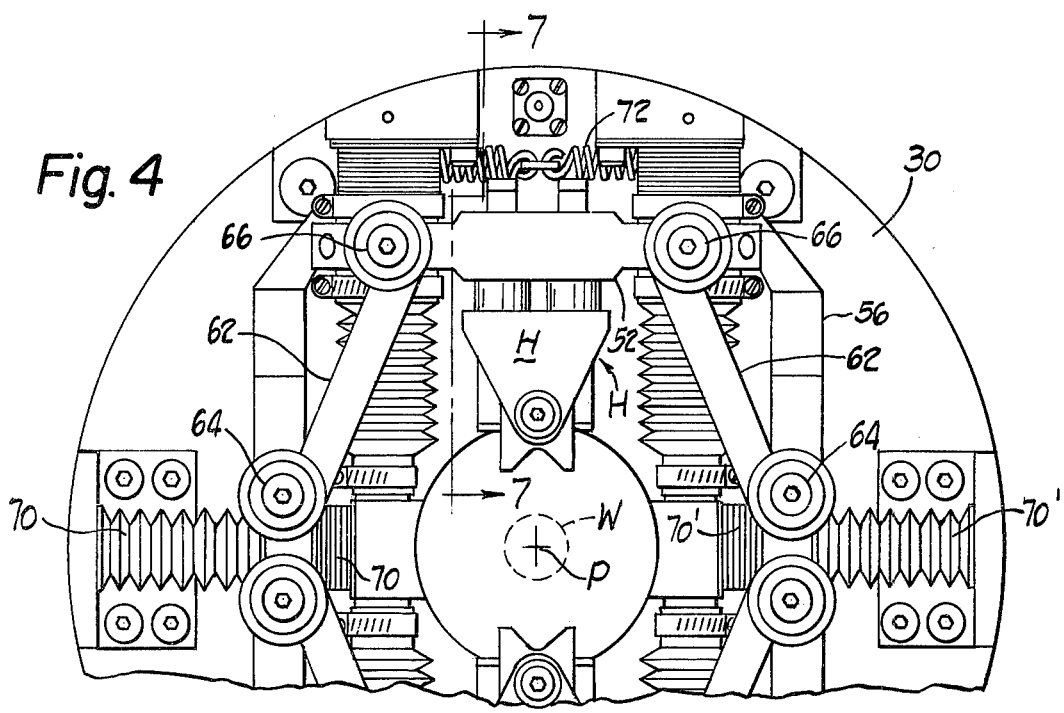
FIG. 4 is a view of the part of the apparatus shown in FIG. 3 with components shown in different operative positions.

Referring now to FIGS. 3 and 4, the head supporting portion 30 includes two pairs of diametrically opposed guide rods 50. A head support member 52 is slidably mounted on each respective guide rod pair for sliding movement in the direction of extent of the guide rods. The head support members 52 preferably define cylindrical bores through which the rods 50 extend. Flexible rubber-like bellows 54 extend about the guide rods 50 from opposite sides of the members 52 to prevent dust or abrasive particles from lodging on the guide rods. The bellows 54 are readily flexible and do not impede the sliding motion of the head support member 52 on the guide rods 50.

The actuator linkages 32 react between the support members 52 and the supporting portion 30 to slide the members 52 along their respective guide rod pairs. The linkages 32 are identical and therefore only one linkage is described in detail. Corresponding parts of the linkages are indicated on the drawing by corresponding primed reference characters. The linkage 32 includes a counterweight 56 slidably mounted on a radially extending counterweight rod 60 which is displaced 90° from the line of sliding motion of the support members 52. The counterweight 56 is formed of a rigid, dense material.

Link bars 62 extend between the counterweight 56 and the respective support members 52. The link bars 62 are each journaled to the counterweight 56 at one end by pivots 64. The opposite end of each bar 62 is journaled to its respective support member 52 by a pivot 66. The guide rod 60 is covered with a bellows 70, the structure and purpose of which is similar to that of the bellows 54.

When the supporting unit 26 rotates, the resultant centrifugal force urges the counterweight 56 radially outwardly. When the speed of rotation is sufficiently high, the counterweight 56 slides outwardly along its rod 60 which causes the link bars 62 to move the support members 52 radially inwardly along the guide rods 50 toward the axis of rotation. This condition of the linkage 32 is illustrated in FIG. 3.

The linkages 32 are disposed at diametrically opposite locations on the supporting portion 30 and the counterweights 56, 56' are interconnected by tension springs 72 which oppose the centrifugal force acting on the counterweights. When the speed of rotation of the supporting unit 26 is low the springs 72 move the counterweights radially inwardly toward each other (see FIG. 4) resulting in the link bars 62 forcing their associated support members 52 radially away from the axis of rotation.

The detection heads H are identical in construction and accordingly only one head H is described in detail in reference to FIGS. 5–7. The head H is connected to the head support member 52 and preferably functions to produce electrical signals indicating the presence of flaws in a workpiece moving along the path of travel P when the member 52 has moved the head to a flaw detecting position. The head H comprises a supporting yoke 80, workpiece engaging guide structure 82 carried by the yoke, and a sensor assembly 84 supported by the guide structure. The guide structure and sensor assembly are supported for flaw detecting engagement with the workpiece by the yoke 80. The signals from the head H are transmitted to suitable processing circuitry, not illustrated, via flexible insulated electrical cable 86 extending from the sensor assembly 84, through elongated openings 87 and 89 in the yoke body 80 and the head support member 52, respectively, to a connector 90 mounted on the support portion 30 (see FIG. 7) and suitable conductors including the aforementioned slip rings.

The yoke 80 is formed by a rectangular plate-like body portion which is connected to the head support member 52 and projecting legs 94 which extend from opposite ends of the yoke body toward the travel path P. The projecting ends of the legs 94 are spaced axially apart along the travel path P and support the guide structure and sensor assembly between them. The yoke body defines an elongated clearance opening 96 through which the cable 86 extends to the sensor assembly.

The yoke 80 is supported for limited resilient universal motion with respect to the head support member 52. As is best seen in FIGS. 5 and 7, the yoke body is provided with four tapped holes 100 which receive respective screws 102 each screw having an unthreaded shank portion 108 extending through bores 104 in the head support member 52. An annular resilient spring member 106 surrounds each screw 102 and is interposed between the yoke body and the head support member. In the preferred embodiment the spring members 106 are formed from a resiliently deflectable foam rubber material.

The spring members 106 are lightly compressed between the yoke body and the support member 52, and the bores 104 have larger diameters than the screws 102 so that the screws can shift angularly within the bores when the spring members 106 are unevenly compressed from their initial slightly compressed conditions. This action provides for limited resilient universal motion of the head H relative to the head support member 52 which enhances the ability of the detector assembly to follow undulations in the workpiece without reducing the sensitivity to flaws.

The guide structure 82 and the sensor assembly 84 are supported between the yoke legs 94 for pivotal movement about an axis 110 extending generally parallel to the travel path P. This enables the guide structure and sensor assembly to track along workpieces having undulations which extend laterally from a plane containing the travel path P and the axis 110 without the relative orientation of the sensor assembly and the workpiece being substantially altered.

The guide structure 82 is formed by a box-like sensor assembly supporting housing which includes parallel side bars 112 extending between the legs 94 in the direction of the travel path P; end plates 114 rigidly connected to the side bars 112 at their respective opposite ends; workpiece engaging guide members 116 carried by the end plates 114; keeper plates 120, 122 and 124 which retain the sensor assembly in the housing; spring biasing elements 126 reacting between the guide structure 82 and the sensor assembly; and pivot pins 130 extending to the respective legs 94 from the opposite ends of the housing along the axis 110. The components of the housing are preferably connected together by screws to enable easy disassembly for servicing and maintenance.

The guide members 116 are constructed to track undulations in the workpieces such that the sensor assembly remains directionally oriented toward the workpiece centerline as well as to enable workpieces of various diameters to be properly aligned with the sensor assembly. The guide members 116 are preferably formed from a wear resistant material, such as a tungsten carbide, and project from the housing toward the travel path P. As is best seen in FIG. 6, the projecting end of each guide member defines a generally V-shaped notch formed by workpiece engaging surfaces 132. When the head H is moved into engagement with the workpiece W the workpiece engaging surfaces 132 extend tangent to and engage the workpiece periphery at spaced locations. This construction enables the sensor assembly to engage the workpiece with a consistent orientation relative to the workpiece centerline.

When workpiece undulations are encountered which cause the workpiece centerline to be shifted laterally from a plane containing the nominal travel path and the axis 110, the guide members 116 and the sensor assembly are shifted together about the axis 110 to track the undulations while maintaining the sensor assembly in an effective flaw detecting orientation with respect to the workpiece centerline. The pivot pins 130 are threaded into tapped holes in the end plates 114 and extend to the legs 94 through clearance holes in the guide members 116. The pivot pins are journaled in the legs 94 by suitable sleeve bearings so that the entire guide structure 82 and the sensor assembly are pivotable together about the axis 110.

The V-shaped notches also enable workpieces having various diameters to be engaged with their centerlines lying in a plane which bisects the angle of the V and thus, within limits, workpieces of various diameters are engageable by the members 116 without altering the geometrical relationship between the centerline of the workpiece and the surfaces 132 since the centerlines of all such workpieces will lie along the line which bisects the angle of the V-notch.

The sensor assembly 84 is supported by the guide structure housing for sliding movement relative to the guide structure toward and away from the path P as well as for pivotal movement with respect to the housing about an axis 134 which extends in a plane transverse to the travel path P between the guide members 116. As is best seen in FIG. 6, the sensor assembly 84 is slidably disposed in slot-like ways 136 formed in the housing side bars 112 and extending between the keeper plate 120 and the keeper plates 122 and 124, respectively. The keeper plates close the opposite ends of the ways and prevent the sensor assembly from being displaced from the guide structure housing. The keeper plate 120 defines an elongated clearance opening 138 through which the cable 86 extends to the sensor assembly 84.

The sensor assembly 84 includes a sensor unit 140 and a sensor unit support housing 142. The sensor unit support housing 142 includes a generally tubular, elongated sensor supporting member 144, disposed between and generally coextending with the guide structure side bars 112, bearing elements 146 for interconnecting the member 144 and the guide structure housing, wear plates 150 connected to the member 144 at its opposite ends, and a sensor unit retainer plate 152 having an opening 153 through which the cable 86 extends to the sensor unit.

The member 144 is biased to project from the guide structure housing toward the path of travel P for engagement with the workpiece. The wear plates 150 are flush with the projecting end 154 and are formed of a wear resistant material, such as tungsten carbide, to minimize wearing of the projecting end of the sensor supporting member by the workpieces. The wear plates are removably connected to the member 144 for each replacement.

The bearing elements 146 are defined by coaxial pivot pins 158 extending oppositely along the axis 134 from the support member 144 which are journaled respectively in slide blocks 160. The slide blocks 160 support the pins 158 for rotation about the axis 134 and are slidably nested in the ways 136 so that the sensor assembly and its pivot axis 134 are shiftable relative to the guide structure along the ways.

The spring biasing elements 126 are supported by the keeper plate 120 and react against the respective slide blocks to urge the sensor assembly along the ways toward the path of travel P relative to the guide structure. The spring elements are preferably formed by an externally threaded tubular spring housing 162 in which a compression spring 164 and a plunger element 166 are disposed so that the plunger transmits the biasing force to the sensor assembly. The threaded spring housing is supported in tapped holes in the keeper plate 120 so that the biasing force and length of slidable travel of the sensor assembly in the ways 136 is controllable by advancing or withdrawing the threaded spring housing.

The sensor unit 140 is positioned within the member 144 and includes an electrical sensing coil 170 encapsulated within a body 172 of dielectric coil supporting material, preferably nylon, which is shaped to conform to the interior of the supporting member 144. The body 172 includes a projecting portion 174 which extends through an elongated opening 176 in the projecting end of the member 144 to a location which is flush with the surface of the projecting end of the member 144 so that the sensor unit 140 rides on the workpiece surface. The projecting sensor unit body portion 174 and the projecting end surface of the member 144 are disposed in a plane which is perpendicular to the plane which bisects the angle of the V notches in the guide members 116.

The cable 86 extends into the body for connection to the coil 172 and the sensor unit is maintained within the supporting member 144 by the retainer plate 152 which is detachably connected across to the open end of the supporting member to enable removal of the sensor unit. As noted previously, the cable 86 is flexible and flexes when the sensor assembly is moved relative to the support unit 26. The elongated openings, 138, 87 and 89 in the retainer plate 120, the yoke 80 and the support member 52, respectively, enable unrestrained flexure of the cable when the sensor unit is moved.

OPERATION

As wire moves from the wire drawing machine to the cold header, the motor 44 drives the head supporting unit 26 to orbit the heads H about the wire path of travel P. When the speed of rotation of the unit 26 reaches a predetermined level, the heads H are urged into their inspection positions by centrifugal forces which maintain the heads biased into engagement with the workpiece.

The workpiece is engaged by the guide members 116 with the workpiece engaging guide surfaces 132 extending tangent to the periphery of the wire. The wire also engages the sensor assemblies and forces each sensor assembly 84 into its respective guide structure support housing against the force of the spring units 126 so that the sensor assembly is biased into engagement with the workpiece periphery by the spring units 126 independently of the guide members 116.

The sensor assemblies and their respective guide structures cooperate so that the workpiece centerline is disposed in a plane which bisects the angle between the workpiece engaging guide surfaces 132 and the sensor assembly rides on the workpiece periphery with its workpiece engaging surface disposed in a plane which is perpendicular to the bisecting plane. The wear plates 150 protect the projecting end of the sensor support unit member 144 and the sensor unit body material from abrasion and excessive wear due to their engagement with the workpiece.

When the length of wire W between the wire drawing machine and the cold header contains a bend or undulation, the wire section extending between the wire drawing machine and the cold header tends to become bowed. The bowed wire interacts with the guide rolls 41 causing the assembly R to shift vertically and/or horizontally to remain generally aligned with the wire. Because of the bowing of the wire section, however, the centerline of the wire becomes shifted from the nominal wire travel path through the inspection system.

Since the speed of rotation of the unit 26 is great compared to the feeding speed of the wire W, the heads H trace parallel closely spaced or overlapping paths about the wire and in so doing must be able to effectively engage the undulating section of the wire continuously about its periphery when the wire centerline is spaced from the nominal travel path P.

It should be appreciated that when the section of the wire W extending through the inspection assembly is bowed, or undulating, the centerline of the wire becomes skewed with respect to the axis of rotation of the assembly R. Hence the plane in which the heads H orbit becomes slightly skewed with respect to the actual centerline of the wire. The guide member 116 at one axial end of each head H thus engages the wire with greater force than the other guide member. The resulting differential engagement force causes the head H to be tipped with respect to its axis of rotation by uneven compression of the spring members 106. The plane of orbit of the head H is thus effectively relocated about the workpiece to be instantaneously maintained perpendicular to the wire centerline notwithstanding the undulation. During a complete orbit of each head, the head moves universally with respect to its support member to retain a constant angular relationship with respect to the wire centerline. As noted previously, the universal motion of the heads H relative to their respective support members is limited in extent.

When the wire centerline is displaced from the nominal travel path, the guide members track the wire periphery to maintain the sensor assembly in engagement with the wire periphery in a plane transverse to a plane extending through the centerline of the wire section engaged by the head. The guide members pivot with respect to the yoke 80 about the axis 110 when the wire is displaced from the nominal travel path so that the wire centerline remains in a constant position with respect to the guide members. The flaw sensor assembly is constrained to pivot with the guide members and thus continues to ride the wire periphery with a consistent orientation relative to the wire centerline.

When the head H passes through the plane of the bow in the wire, the guide members are, in effect, unresponsive to the bow in the wire. This is because the wire centerline adjacent the sensor unit may tend to extend closer to or farther away from the sensor unit than the wire centerline locations adjacent the guide members. Furthermore, since the universal motion of each head H with respect to its support member is limited, the wire W may firmly engage one guide member but not the other guide member when the limit of universal head movement has been reached. When circumstances exist, the sensor assembly remains in effective tracking engagement with the wire due to the action of the spring units 126 which enable the sensor unit to resiliently shift into and out of the guide structure housing independently of the guide members 116. Angularity between the direction of extent of the wire centerline and the effective plane of rotation of the head H is also tracked by the sensor unit 140 independently of the guide members 116 by pivotal motion of the sensor unit 140 about the axis 134 relative to the guide structure.

While the invention has been illustrated and described in reference to a single embodiment of one preferred construction, the invention is not to be considered limited to the precise construction disclosed. Various adaptations, modifications and uses of the invention may occur to those skilled in the art and the intention is to cover all such adaptations, modifications and uses which come within the spirit or scope of the claims.

What is claimed is:

1. Apparatus for nondestructively inspecting elongated workpieces having relatively small diametrical extents and moving along a path of travel comprising:
   a. a support unit disposed about said path of travel;
   b. structure supporting said support unit for rotation about a first axis generally coextending with said path of travel;
   c. drive means for rotating said support unit about said first axis;
   d. an inspection head carried by said support unit for rotation therewith; and,
   e. a head support member coupled between said head and said support unit for enabling movement of said head relative to said support unit toward and away from said first axis;
   f. said head comprising:
      i. a supporting element;
      ii. structure for connecting said supporting element to said head support member for relative universal movement;
      iii. a guide structure coupled to said supporting element for pivotal movement relative to a second axis extending generally parallel to said first axis and comprising a support housing and divergent workpiece engaging surfaces which project from said housing and engage said workpiece to track along undulations in the workpiece by pivoting about said second axis as said surfaces move about the workpiece;
      iv. a sensor assembly supported at least partly within said support housing for pivotal movement with said guide structure about said second axis and including a portion projecting from said support housing toward said first axis;
      v. bearing elements connecting said sensor assembly to said support housing for pivotal movement relative to said guide structure about a third axis extending generally transverse to said second axis and for translational movement relative to said support housing toward and away from said first axis; and,
      vi. means for biasing said sensor assembly toward engagement with a workpiece engaged by said workpiece engaging surfaces, said means for biasing said sensor assembly cooperating with said bearing elements to maintain said sensor assembly in engagement with workpiece undulations disposed generally in a plane extending through said first and second axes relative to the sensor assembly.

2. The apparatus claimed in claim 1 wherein said workpiece engaging surfaces define a generally V-shaped section of said guide structure.

3. The apparatus claimed in claim 1 wherein said guide structure further comprises a second pair of divergent workpiece engaging surfaces, said pairs of workpiece engaging surfaces disposed, respectively, on opposite sides of said sensor assembly and spaced apart along said first axis.

4. The apparatus claimed in claim 1 wherein said biasing means comprises at least a spring member reacting between said guide structure support housing and said bearing elements.

5. The apparatus claimed in claim 1 wherein said structure for connecting said supporting element to said head support member for relative universal movement comprises a resiliently deformable member interposed between said supporting element and said support member and at least an elongated fastener element engaging said supporting element and said support member for resiliently compressing said resiliently deformable member while enabling relative universal angular motion between said supporting element and said support member.

6. A method of detecting flaws in elongated workpieces having relatively small diametrical extents traveling along a path comprising:
   a. stationing a rotatable support unit about the path;
   b. coupling an inspection head to the support unit, the inspection head including a supporting element, guide structure connected to the supporting element and a sensor assembly connected to the guide structure;
   c. rotating the support unit and inspection head about a first axis generally coextending with said path;
   d. moving said inspection head toward said path relative to said support unit;
   e. engaging said guide structure with a workpiece on said path at least at first and second locations spaced apart peripherally along the workpiece.
   f. resiliently engaging said sensor assembly with the workpiece at a third location adjacent said first and second locations; and,
   g. maintaining said sensor assembly in contact with undulations in the workpiece moving along the path as the support unit moves about the workpiece by:
      i. universally moving said head relative to the support unit in response to the guide structure encountering workpiece undulations so that the sensor assembly tends to maintain contact with the workpiece;
      ii. pivoting said guide structure and said sensor assembly as a unit relative to said supporting element about a second axis extending generally parallel to said first axis in response to the guide structure encountering workpiece undulations;

iii. pivoting said sensor assembly relative to said guide structure about a third axis extending in a direction generally transverse to said first and second axes in response to the sensor assembly encountering workpiece undulations;

iv. resiliently shifting said sensor assembly toward and away from said path realtive to said guide structure while maintaining said sensor assembly engaged with the workpiece.

* * * * *